United States Patent

[11] 3,568,907

[72] Inventor James Power Watson
 Jupiter, Fla.
[21] Appl. No. 822,173
[22] Filed May 6, 1969
[45] Patented Mar. 9, 1971
[73] Assignee RCA Corporation

[54] REDUCTION OF TAPE STICTION
 9 Claims, 3 Drawing Figs.

[52] U.S. Cl. .................................................. 226/97
[51] Int. Cl. .................................................. G11b 23/12
[50] Field of Search ..................................... 226/7, 97,
  95, 196; 242/182, 183, 184, 185

[56] References Cited
UNITED STATES PATENTS

| | | | |
|---|---|---|---|
| 3,091,408 | 5/1963 | Schoeneman | 226/97X |
| 3,091,409 | 5/1963 | Goodale | 226/97 |

*Primary Examiner*—Allen N. Knowles
*Attorney*—H. Christoffersen

ABSTRACT: Tape stiction between a tape loop and the walls of a vacuum chamber is reduced by creating an air film, at a pressure greater than that within the tape loop, between the tape and walls.

INVENTOR
James Power Watson
BY H. Christoffersen
ATTORNEY

REDUCTION OF TAPE STICTION

BACKGROUND OF THE INVENTION

In high-speed tape-handling apparatus, particularly the type used for magnetic tape handling, the flexible tape may be subject to irregular, rapid accelerations and decelerations and steady movement. Since the tape supply means normally cannot respond immediately to such movement, a tape loop in a vacuum chamber commonly is positioned between the supply means and tape-driving means, to provide a buffer.

When the tape is moved through the vacuum chamber, there is a tendency for electrostatic charge and moisture buildup on the tape surface and this causes the tape to tend to adhere to the chamber walls. Such adhesion, known as "stiction", produces a heavy drag on the tape and this may materially affect the functioning of the tape drive apparatus. Friction between the surface of the tape and chamber surface may also introduce an adverse drag on the tape to further impede the operation of the tape drive apparatus.

Several attempts have been made in the prior art to solve the problem. In one solution, a special semimetallic paint is applied to the walls which, when contacted by the tape, tends to prevent accumulation of electrostatic charge. However, the problem of friction is still present.

A second solution is to line the chamber walls with tape embedded with glasslike beads to provide minimal contact between tape sides and chamber walls. Unfortunately, the glass beads have a tendency to fracture providing a jagged surface which damages the tape.

A third solution is to provide a ribbedlike surface on the chamber walls in contact with the tape surface. This method, while tending to lessen contact area and thus friction, does not eliminate it. In addition, the ribbed surface is relatively costly to manufacture and difficult to keep dirt free.

The object of the present invention is to provide an improved means for solving the problem above.

BRIEF SUMMARY OF THE INVENTION

The tendency of a tape to adhere to the walls of a vacuum chamber is reduced by creating an air film between the tape and walls.

DETAILED DESCRIPTION

Figure 1:
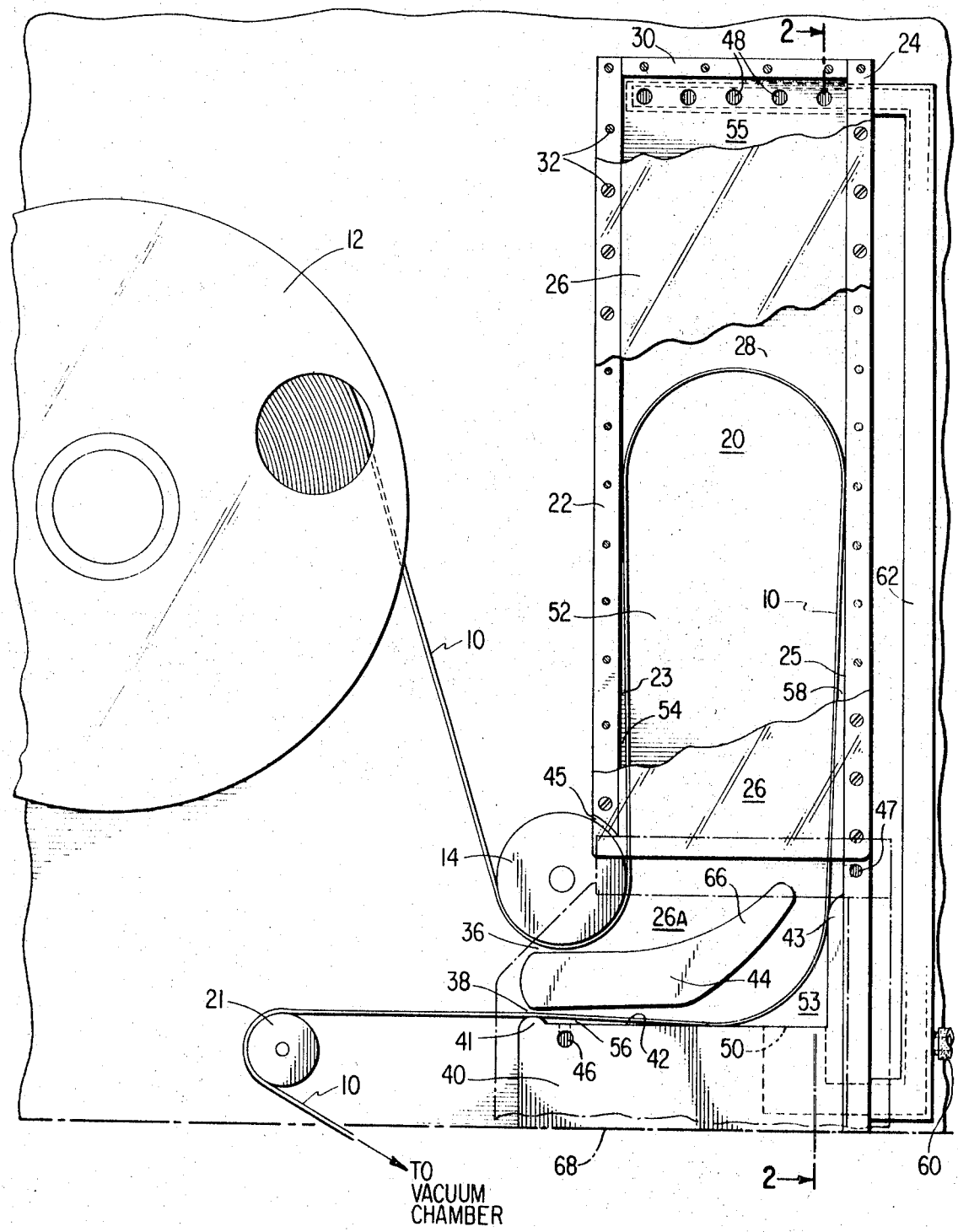
FIG. 1 is a front view of a portion of a tape-handling mechanism incorporating an embodiment of the present invention.

Referring first to FIG. 1, numeral 10 refers to tape which, in a preferred embodiment, may be a magnetic tape comprising a plastic base coated on at least one surface with suitable magnetic recording material. The tape 10 is adapted to be fed from a tape supply means comprising a tape reel 12 and feed therefrom over a guide roller 14 into a tape loop vacuum chamber 20. From the vacuum chamber, tape 10 passes a drive capstan 21 and then extends through another vacuum chamber (not shown) which may be similar to chamber 20 and finally to a tape takeup means (not shown). The vacuum chamber comprises sidewalls 22 and 24, rear wall 28, and transparent front wall 26 (shown partially broken away) which may be made of glass. The rear wall 28 may be a part of the deck plate on which other tape handler components are mounted. A portion of the front wall 26, numbered 26a, shown in phantom may, in a practical embodiment, be hinged to permit easy tape loading and unloading.

Walls 22 and 24 which, while illustrated as being parallel, may tend toward convergence in an alternate embodiment. Front wall 26 is attached in airtight manner to side walls 22 and 24 and end wall 30 by suitable fasteners 32. Members 22, 24, and 30 are attached to the rear wall 28 in such a manner as to be air tight.

Figure 2A:
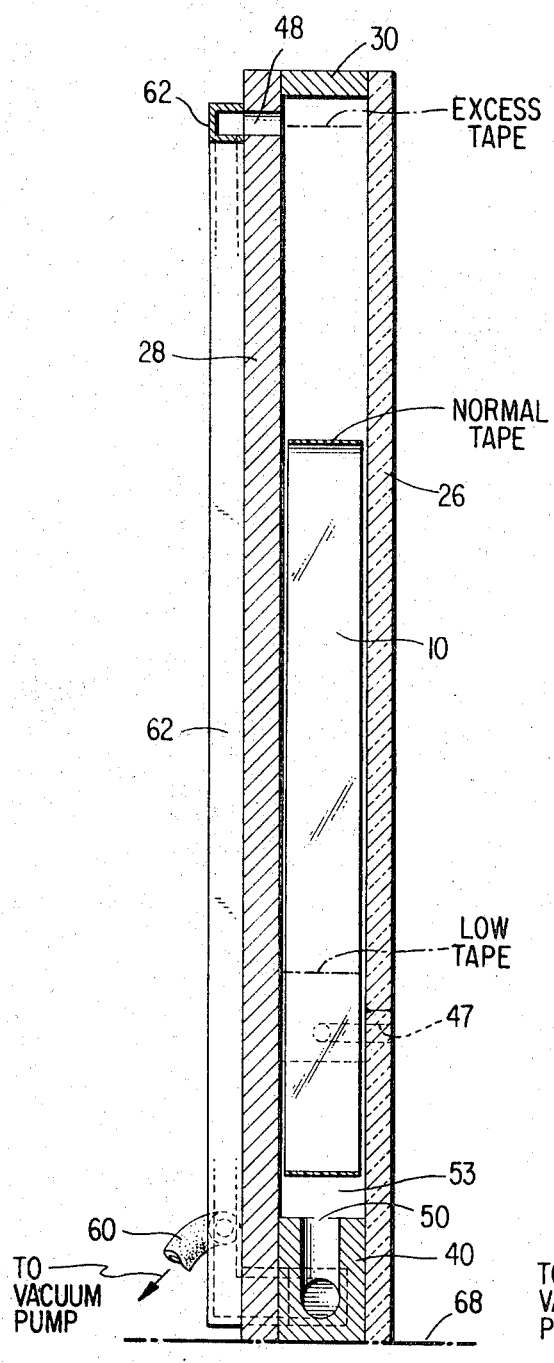
FIG. 2a is a cross section taken through the vacuum chamber along line 2–2 of FIG. 1, showing a vacuum chamber with parallel front and rear walls.
Figure 2B:
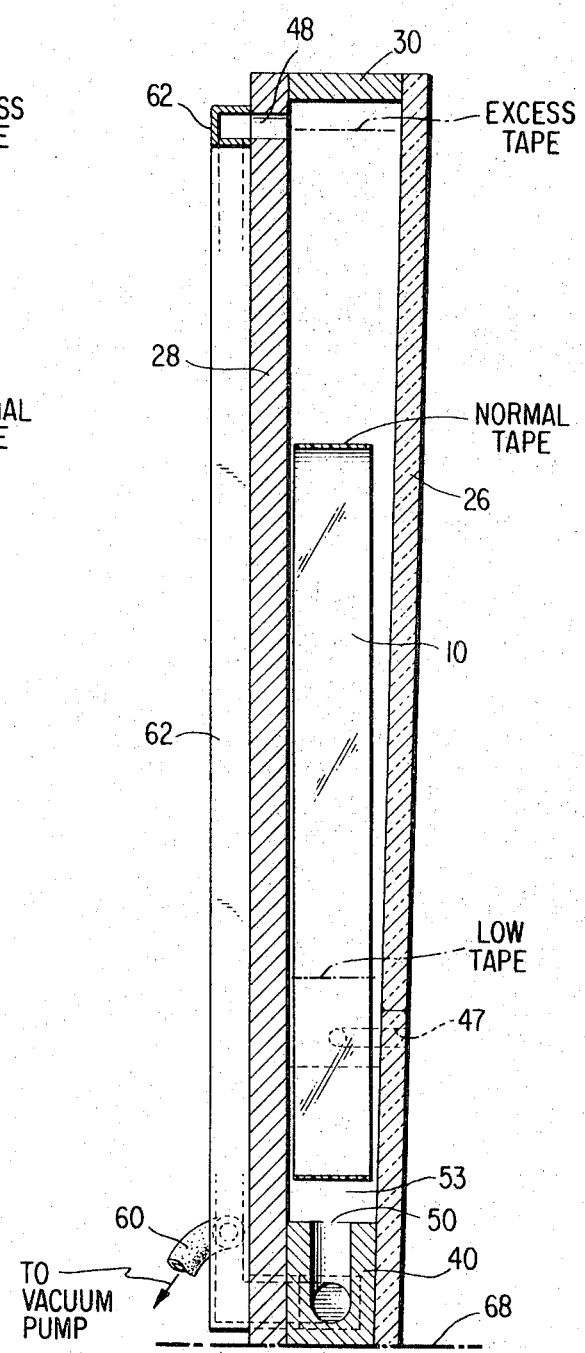
FIG. 2b is a cross section taken through the vacuum chamber along line 2—2 of FIG. 1, showing a vacuum chamber with nonparallel front and rear walls.

Referring for a moment to FIG. 2a, which shows a cross section of the vacuum chamber in the preferred embodiment, it will be noted that walls 26 and 28 are parallel and spaced a distance only slightly greater than the width dimension of the tape 10. Alternately, the front wall 26 may be set at an acute angle relative to rear wall 28 as illustrated in FIG. 2b where the angle is greatly exaggerated. In still another embodiment (not shown) the front wall, while generally parallel to the rear wall, may be generally stair-step shaped so as to be, for example, somewhat farther from the rear wall at the bottom than at the top. The gap between tape 10 and the front and rear walls in FIG. 2 is highly exaggerated. The nominal total gap in the preferred embodiment of FIG. 2a is 0.008 inch.

Returning to FIG. 1, openings 36 and 38 are provided in vacuum chamber 20 for tape ingress and egress. In the preferred embodiment, these are placed in an area created by a shortened sidewall 22. An L-shaped element 40 functions as an end wall opposite wall 30 and operates as a tape guide for the side opening 38 illustrated. A ridge 41 of semicircular cross section, which extends from front wall 26 to rear wall 28 on member 40, serves to space the tape 10 away from surface 42 of member 40. Further, ridge 41, surface 42, and tape 10 combine to form an area of trapped air 56, the purpose of which will be discussed later. Similarly, the upright portion 43 of the L-shaped member 40 spaces the tape 10 from surface 25 of wall 24 and provides an area of trapped air 58.

A member 44 secured to rear wall 28 in the opening of chamber 20 serves a dual purpose. It restricts the flow of air into the chamber by blocking the greater portion of the opening. End 66 of member 44 is shaped as illustrated to act as a tape guide in the occasional circumstance where tape 10 is drawn away from area 53 as, for example, when vacuum is induced in chamber 20 during turn on of tape station. A similar element (not shown) also acts as a tape guide in a vacuum chamber (not shown) which may be a mirror image of vacuum chamber 20 taken about center line 68. In the latter instance, when the tape is first manually inserted into the vacuum chamber with vacuum turned off, except for the presence of end 66, the tape loop would collapse by gravity acting on the tape.

Air at atmospheric pressure is permitted to enter at region 45 between pulley 14 and wall 22. It is also permitted to enter at right-angle openings 46 and 47 with inner terminals centered in the thickness dimension of member 40 and wall 24 respectively. Openings 46 and 47 extend through front wall 26. As will be described shortly, air entering openings 45, 46, and 47 does not freely enter the main portion 52 of chamber 20 because the opening between the tape 10 and the walls 26 and 28 of the chamber is relatively small, about 0.008 inch in the preferred embodiment.

A vacuum pump (not shown) is coupled to chamber 20 by base 60 and duct 62. Openings 48 and 50 provide outlets from the chamber to duct 62. In the preferred embodiment, the vacuum pump maintains a vacuum of approximately 32 inches of water in the vicinity of openings 48 and 50.

In operation of the tape system, tape 10, as it is being drawn through the vacuum chamber 20, is held in the approximate position shown in FIG. 1, by vacuum. During such movement, the tape tends to adhere to surfaces 23, 25, and 42 as a result, it is believed, of the static charge which develops due to the tape movement. Because airflow is restricted into the main portion of the chamber by member 44 and because air is being withdrawn from area 52 through the gaps between the edges and the front and rear walls 26, 28 into the lower pressure regions 53 and 55, a slight vacuum is created in area 52. In the preferred embodiment, the design parameters such as the sizes of the various regions within the chamber, the size of the openings between the region 52 and the regions 53 and 55, the size of openings 36 and 38, the size of the pump and so on are chosen to produce a vacuum of about 2 inches of water in area 52. In the alternate embodiment of FIG. 2a nonparallel front and rear walls in combination with the above-stated parameters may create a vacuum in area 52 ranging from zero to the vacuum created by the vacuum pump.

As the main region 52 of the vacuum chamber is at reduced pressure, it causes air at atmospheric pressure to flow through openings 45, 46, and 47 so as to create an air film between the tape and the chamber walls in the regions 54, 56, and 58 respectively. This air film, at substantially atmospheric pressure, continuously flows through the very small openings between the tape edges and the front and rear walls 26, 28 of the vacuum chamber and into region 52. In the preferred embodiment, as illustrated in FIG. 1, the air film takes the shape of an air wedge. This air film or air wedge sufficiently reduces any tendency that the tape has to adhere to the walls to permit substantially friction free movement of the tape through the vacuum chamber 20.

It may appear from FIG. 1 that the tape 10 would always be kept from contact with wall surfaces 23, 25, and 42 by elements 14, 41, and 43 respectively even with no air film present. However, because the tape often starts and stops rapidly, sufficient momentary slack is sometimes created in the tape loop along any wall surface to permit the tape to come in contact with that wall surface. When this occurs under some atmospheric conditions, the electrostatic charge and moisture buildup on the tape cause such severe adhesion between the tape and walls that the capstan, if it is of the low-torque type, stalls and if it develops a high torque, causes the tape to break.

Pull gauge tests were performed on the preferred embodiment and compared with similar readings on an unmodified vacuum chamber (i.e., member 44 removed and openings 46 and 47 blocked) thus reducing vacuum in area 52 to zero. Measurements were made using a spring scale secured to the tape end that normally goes to capstan 21 with the opposite tape end anchored outside of column after exiting over pulley 14. Without modification, the friction force is about 6 ounces. As modified in the preferred embodiment, the friction force is about three-fourths ounce—close to a factor of 10 improvement.

It was mentioned earlier in the discussion that a variable gap might be allowed to exist between the tape and front cover as illustrated in FIG. 2b. The amount of gap depends on the position of tape in the vacuum chamber. Capstan 21 draws tape 10 through the chamber starting or stopping as determined by external control, not shown. Tape supply reel 12 cannot pay out correct amounts of tape instantaneously because of its mass, so the loop of tape in chamber 20 varies in length varying between the approximate extreme limits shown in FIG. 2.

As the tape gap is one of the factors creating the slight vacuum in area 52, a variation of tape position will result in a corresponding variation of vacuum. A variation in vacuum will result in a variation in the pull on the tape loop and also in the amount of air film present in areas 54, 56, and 58. These variations combine to produce useful effects in particular vacuum chamber configurations. In effect they produce a variable rate "air spring" which can be used to damp out oscillations in tape transport systems.

It is, of course, to be understood that the figures illustrate only one of the many possible shapes of vacuum chambers that could utilize the invention.

I claim:

1. In a tape system which includes a vacuum chamber, a tape within the chamber, forming a loop a surface of which lies on and tends to adhere to walls of the chamber as the tape is drawn through the chamber, a method for reducing this tendency comprising the step of creating a film of air, at a pressure greater than that within the tape loop, between at least the major portion of tape surface and the walls to which it tends to adhere.

2. In a tape system which includes a vacuum chamber, a tape within the chamber forming a loop a surface of which lies on and tends to adhere to walls of the chamber as the tape is drawn through the chamber, a method for reducing this tendency comprising the step of creating a wedge-shaped air film which is relatively thicker in the region of the chamber where the loop enters said chamber than in the region thereof further into the chamber and which is at a pressure greater than that within the tape loop, between at least the major portion of tape surface and the walls to which it tends to adhere.

3. In combination:
 a vacuum chamber;
 a driven tape forming a loop within the chamber, a surface of which tape is adjacent to and tends to stick to walls of said chamber as the tape is drawn through the chamber; and
 means for reducing said sticking tendency comprising means for maintaining the air pressure of the volume defined by the inner surface of said tape loop lower than that between the outer surface of said tape and said walls to thereby form an air film between said tape surface and the walls to which it is adjacent.

4. In the combination as set forth in Claim 3, wherein said last-named means comprises:
 means including passages between the tape and chamber for permitting air to enter between the tape and walls and means for restricting the flow of air into the volume within said loop; and
 means for introducing air between the tape and walls comprising the means for creating a vacuum in said chamber, said vacuum causing a reduced air pressure within said loop relative to that in the region between said tape and said walls, thereby causing air to be drawn through said passages and between the tape and walls while it is being withdrawn from said chamber.

5. In the combination as set forth in claim 3, said last-named means comprising:
 means for spacing the tape from the walls at the point the tape enters and leaves the chamber;
 means including passages between the tape and chamber for permitting air to enter said spaces between the tape and walls; and
 means for introducing air into said spaces comprising the means for creating a vacuum in said chamber, said vacuum causing air to be drawn through said passages and into said spaces while it is being withdrawn from said chamber.

6. In the combination as set forth in claim 5, said means spacing the tape from the walls providing at least one wedge-shaped space extending in the loop direction, said wedge-shaped space having a smaller opening toward the closed end of the loop than at the region of the loop closer to where it is admitted to the chamber.

7. In combination:
 a vacuum chamber comprising a pair of walls separated a nonuniform distance;
 a tape forming a loop within the chamber with its width dimension extending between the said pair of walls, the said walls being spaced only slightly greater than the tape width dimension; and
 means including vacuum-producing means for exerting a variable pressure on the tape in proportion to the position of the tape loop within the chamber.

8. In combination:
 an elongated vacuum chamber having an end wall and opposite sidewalls;
 a driven tape forming a loop within said chamber, having a curved portion extending toward said end wall, and relatively straight portions which tend to stick to said sidewalls as said tape is drawn through the chamber;
 means for creating a region between said sidewalls and said tape at relatively high pressure;

means for maintaining the region between the curved portion of the loop and said end wall at relatively low pressure for drawing said tape into said chamber; and means for maintaining the region within said loop at a pressure between said relatively high and low pressures, the pressure differential thereby existing between the region within said loop and the regions between said sidewalls and the tape maintaining the tape spaced from said walls over the major portion of the extent of said relatively straight portions of said tape.

9. An elongated vacuum chamber having an opening at one end, an end wall at the other end, and sidewalls extending from said opening to said end wall;

a driven tape extending into said opening forming a loop within said chamber a surface of which is adjacent to and tends to stick to said sidewalls as said tape is driven through the chamber;

means for restricting the flow of air into said opening and into the region comprising the interior of said loop;

passages in said sidewalls for permitting the flow of air into the region between said sidewalls and said tape; and vacuum means coupled to the other end of said chamber sidewalls creating a relatively low first pressure differential between the region of the chamber adjacent to the end wall and region of the chamber within the loop and a relatively high second pressure differential between the region of the chamber adjacent to said end wall and the regions between said side and said tape, whereby said tape is urged away from contact with said sidewalls.

UNITED STATES PATENT OFFICE
CERTIFICATE OF CORRECTION

Patent No. 3,568,907            Dated March 9, 1971

Inventor(s)    James Power Watson

It is certified that error appears in the above-identified patent and that said Letters Patent are hereby corrected as shown below:

In Column 6, line 8, change "sidewalls" to ---for---; line 13, change "side" to ---sidewalls---.

Signed and sealed this 21st day of December 1971.

(SEAL)
Attest:

EDWARD M. FLETCHER, JR.         ROBERT GOTTSCHALK
Attesting Officer                 Acting Commissioner of Pater